United States Patent [19]

Kadle

[11] Patent Number: 5,062,477

[45] Date of Patent: Nov. 5, 1991

[54] HIGH EFFICIENCY HEAT EXCHANGER WITH DIVIDER RIB LEAK PATHS

[75] Inventor: Prasad S. Kadle, Getzville, N.Y.

[73] Assignee: General Motors Corporation, Detroit, Mich.

[21] Appl. No.: 677,193

[22] Filed: Mar. 29, 1991

[51] Int. Cl.⁵ ............................................. F28D 1/03
[52] U.S. Cl. .................................. 165/174; 165/152; 165/176; 62/525
[58] Field of Search .................. 62/515, 525, 527; 165/152, 153, 174, 176

[56] References Cited

U.S. PATENT DOCUMENTS

| | | | |
|---|---|---|---|
| 3,976,128 | 8/1976 | Patel et al. | 165/153 |
| 4,217,953 | 8/1980 | Sonoda et al. | 165/44 |
| 4,800,954 | 1/1989 | Noguchi et al. | 165/153 |
| 4,854,380 | 8/1989 | Yoshida et al. | 165/152 |

FOREIGN PATENT DOCUMENTS 52-37255  3/1977  Japan ..................................... 62/515

*Primary Examiner*—Allen J. Flanigan
*Attorney, Agent, or Firm*—Ronald L. Phillips

[57] ABSTRACT

An evaporator for an automotive air conditioner having a plurality of tubes arranged side by side so that the tubes form spaces for air centers and channel heated air past the sidewalls of the tubes. Each tube has a divider rib to define liquid and vapor passages for the flow of refrigerant around the end the rib in a general U-shaped flow. The ribs have spaced bypass openings therein so that each rib is able to allow the leakage of liquid refrigerant across the rib from the liquid to the vapor side to eliminate dry out areas and thereby increase heat exchanger efficiency.

4 Claims, 2 Drawing Sheets

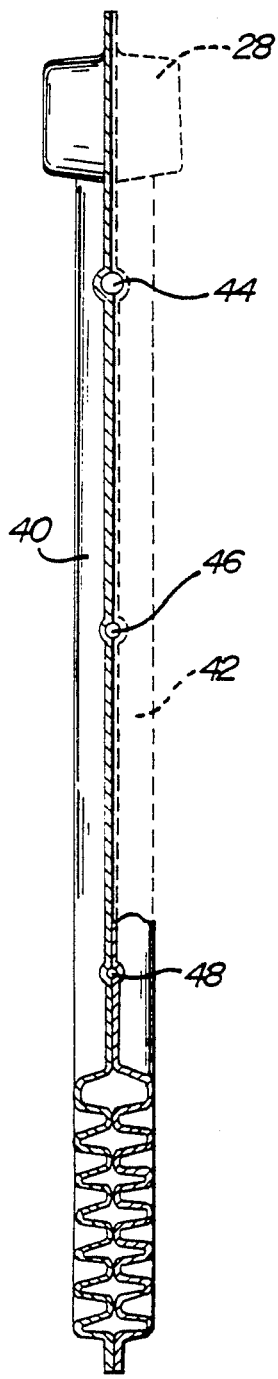
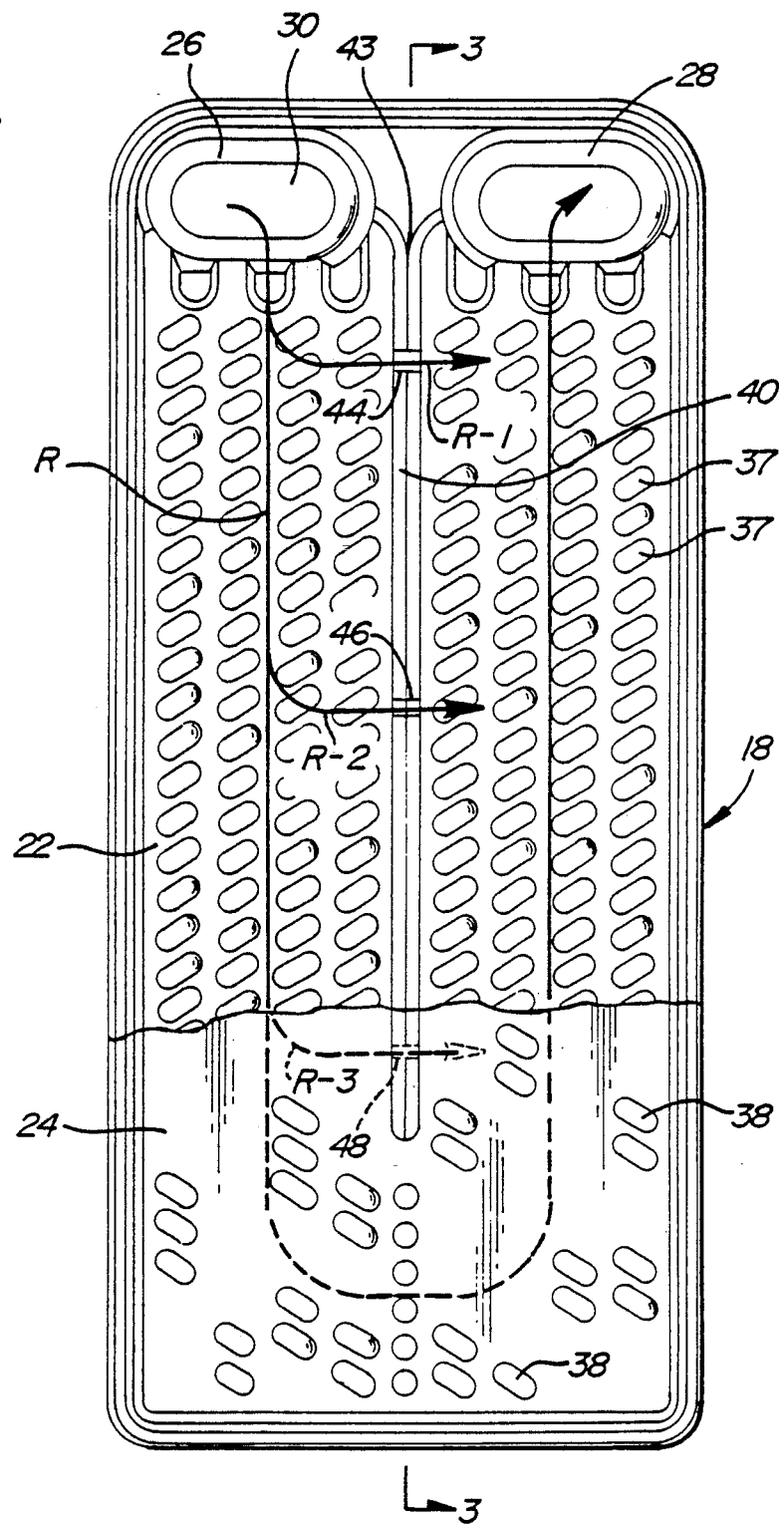

HIGH EFFICIENCY HEAT EXCHANGER WITH DIVIDER RIB LEAK PATHS

FIELD OF THE INVENTION

This invention relates to heat exchangers and more particularly to new and improved refrigerant flow tubing flattened and having an internal fluid flow divider rib to provide a U-type flow paths therethrough with predetermined leak paths across the rib to reduce tube dry out areas and so that downstream tubes will transmit increased quantities of heat exchanger fluid which are capable of changing to a volatile state thereby increasing the efficiency of the heat exchanger.

BACKGROUND OF THE INVENTION

Various multi plate heat exchangers have been devised prior to the present invention to increase their heat exchanger efficiency and usefulness. Among these heat exchangers is the type disclosed in my copending application U.S.S.N. 474,891 filed Feb. 5, 1990 for TUBULAR PLATE PASS FOR HEAT EXCHANGER WITH HIGH VOLUME GAS EXPANSION SIDE, assigned to the assignee of this invention and hereby incorporated by reference. This heat exchanger has a plurality of flattened tubes which are operatively joined at their tank ends to form a core for the passage of volatile heat exchanger fluid therethrough from an intake to an outlet. Each of these tubes has a divider rib to provide a U-flow type passage for the flow of the heat exchanger fluid in each tube with the first or forward course of the U-flow basically conducting the refrigerant in a liquid phase and the back course conducting the refrigerant in the gaseous state. Such heat exchanger tubes are generally rectilinear and are arranged into a core so that the tubes have a thin leading and trailing edges with sides flattened to provide large area heat exchanging surfaces therebetween. This allows the air to flow across the large surface areas with minimized resistance to air flow. With such constructions local dry out areas occur and the heat transfer rate is significantly reduced because the gaseous phase heat transfer efficiency is significantly lower than a liquid or a changing phase mixture of liquid and gas. Accordingly, the front or leading side of the heat exchanger is generally more efficient in heat transfer than the back side thereof with the rib in each tube defining the front and back sides. As a unit, this is caused largely by the fact that the front side of the heat exchanger contains a larger content of liquid than gas as the heat exchanger fluid courses through the core, and accordingly, has a higher potential for heat transfer because of latent heat of vaporization.

In view of the above, this invention provides a new and improved evaporator which features unique U-flow rib or divider construction which eliminates or sharply reduces local dry out areas in an evaporator by improving control of the change in phase from a liquid to a gas as the heat exchanger fluid courses through the heat exchanger from the inlet to the outlet thereof. More particularly, by feeding liquid, or a two phase mixture containing higher quantity of liquid, to the gaseous side of each tube ensures that dry out areas will be significantly reduced and heat transfer efficiency will improve.

Accordingly, it is a feature, object and advantage of this invention to provide a new and improved tube for use in a heat exchanger core in which leak paths are provided from the front side of the tubes comprising the core to the rear side of the tubes so that volatile liquid can short circuit the forward areas of at least some of the tube so as to be available for vaporization in dry out areas, and particularly, in downstream tubes to thereby increase the efficiency of the heat exchanger core.

In a preferred embodiment of the present invention, dry out can be effectively eliminated by providing heat exchanger fluid bypass channels in the divider rib. These channels are sized to eliminate back flow, as well as to keep the lower part of the plate fed with refrigerant since a large bypass channel may short circuit too much of the liquid refrigerant. Also, towards the lower part of the tube, these channels may be progressively smaller in size and flow capacity as the need for bypassing liquid refrigerant reduces. For ease of manufacture, these channels may be substantially the same size and still provide improved efficiency. These bypass channels may be important in the evaporator with an expanding freon path as in my prior application, identified above, since the likelihood of local dry out is substantially higher.

BRIEF DESCRIPTION OF THE DRAWINGS

FIG. 2 is a plate used in one of the tubes of the heat exchanger;

FIG. 3 is a cross-sectional view taken along lines 3—3 of the tube of FIG. 2.

DETAILED DESCRIPTION OF THE DRAWINGS

Figure 1:
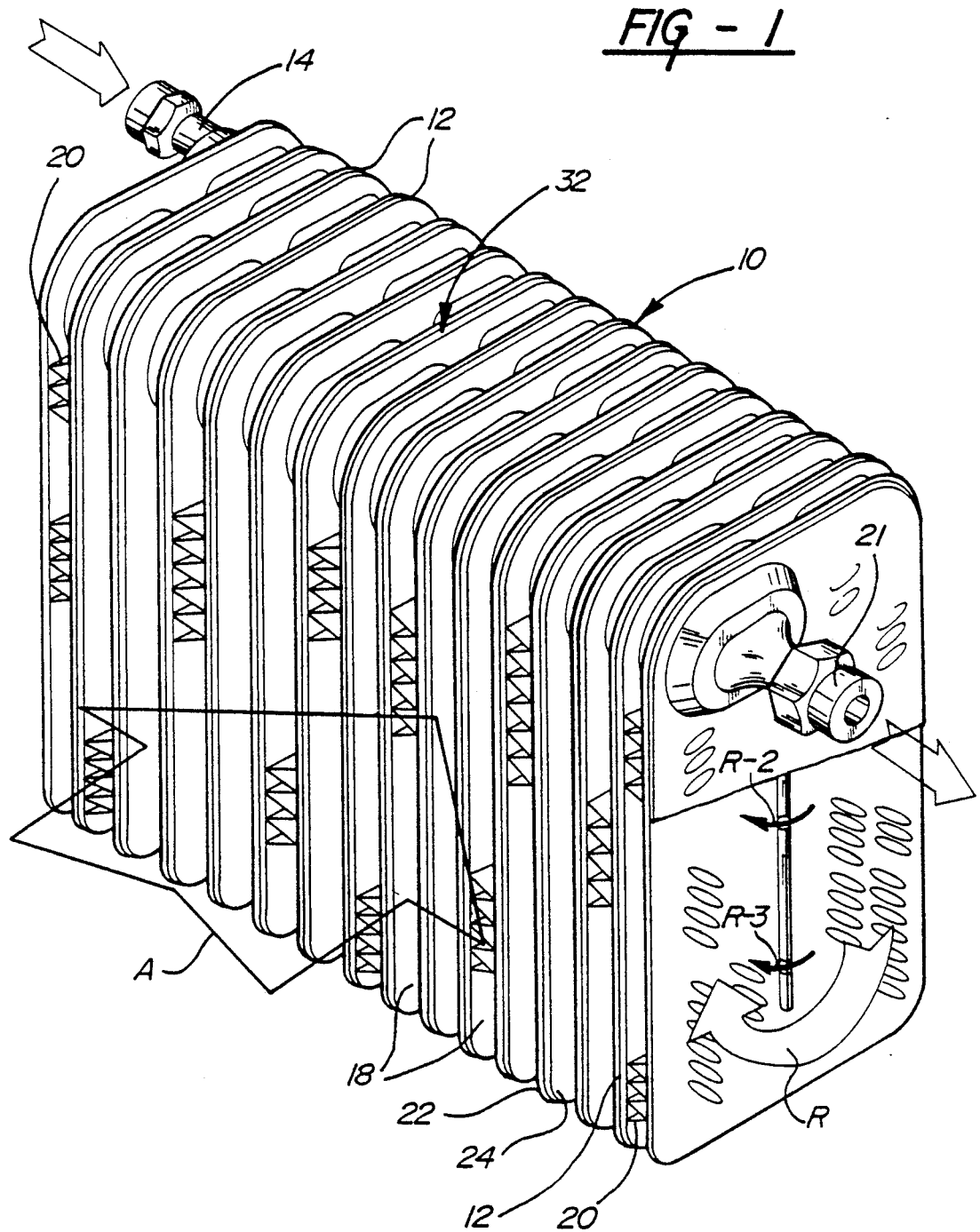
FIG. 1 is a pictorial view with parts cut away of a heat exchanger.

Turning now in greater detail to the drawings, there is shown in FIG. 1 a finned cross flow heat exchanger 10 in the form of an evaporator core for an automotive air conditioning system adapted to be mounted within a module in the engine passenger compartment of the automobile. The heat exchanger 10 comprises a plurality of generally flattened fluid conducting tubes 12 hydraulically interconnected with one another to provide a generally serpentined flow path for the heat exchanger fluid supplied thereto by way of an intake pipe 14 operatively connected into the first tube 12. The heat exchanger fluid is initially in a liquid state as it enters into the core of the heat exchanger from the condenser, not shown, and as it courses through the exchanger, the exchanger fluid boils and changes phase from liquid to a gaseous phase. The tubes 12 are physically mounted parallel to one another, and are connected at their upper and lower ends, and are arranged to define spaces 18 therebetween to accommodate air centers or fins 20. These air centers, fixed between the flattened body portions of each of the plates, are corrugated thin sheets of aluminum of other suitable metal and operate to increase the heat transfer performance of the heat exchanger.

In an air conditioner evaporator, a cross flow of air, flow arrow A, forced thorough the fins of the heat exchanger by a fan, whose speed and output is under control of vehicle occupants, loses heat energy to the refrigerant circulating internally through the tubes which boils and vaporizes and is discharged in the gaseous phase through pipe 21 to the compressor, not shown, which again changes the phase of the refrigerant to a liquid for circulating back to the evaporator to complete the system to cool the interior of the automobile.

Each tube is fabricated from a pair of mating plates 22 and 24, see FIG. 2, which are substantially identical to one another. Each plate is a flat stamping except that the upper end has a pair of side by side oval protuberances 26 and 28 with openings, such as opening 30, so that adjacent tubes operatively interconnect with one another to transmit heat exchanger fluid. The interconnected protuberances define a tank portion 32 of the core. The protuberance 26 has an axially extending annular collar around opening 30 which closely fits and connects into the opening of the protuberance of the adjacent tube.

As shown in the drawings, each core plate has a pattern of inwardly extending dimples of bumps 37, 38 which, when the core plates are brazed together, provide for optimized mechanical strength and for varying the flow paths through each tube for more effective transfer of heat energy between the heat exchanger fluid and the ambient air.

In addition to the extending bulb like protuberances, each of the plates 22, 24 is formed with and elongated inwardly projecting divider rib 40, 42, which extends from a root 43 about ¾ of the length of the plate for brazed connection to one another, as shown in FIG. 3, to form a partition so that the refrigerant is forced through a circuitous U-flow path through each tube from the inlet pipe to the outlet pipe. This flow is well known in this art as a U-shaped flow and the divider rib may be centrally located to partially bisect each tube.

However, as disclosed in my copending application U.S.S.N. 474,891, filed Feb. 5, 1990, identified above, the divider rib can be offset with respect to the centerline and have various curved shapes, as desired, to provide increased volume for the expansion of the refrigerant as it changes from a liquid to a gaseous state for absorption of heat energy.

Importantly, in this invention the divider rib in each plate is formed with specialized construction to prevent dry out areas in the tubes as the refrigerant flows from the inlet to the outlet and the refrigerant changes from a liquid to a gaseous phase. The dry out areas are essentially areas in which there is little or no liquid to absorb heat energy. Generally, these areas occur in the gaseous or vapor side of each plate and there are increased dry out areas occurring as the refrigerant flows from the first pass to the other passes downstream of the first pass. Since the tubes are physically arranged parallel to one another with the thin forward edge of the liquid side of the plates of the core providing the air inlet and the thin vapor side or each tube cooperating with adjacent vapor side end edges providing the air outlet, the heated air initially flows across the liquid side of each tube and then across the vapor section. This invention accordingly provides strategically spaced leak paths to enable some of the refrigerant in the liquid state to leak across the liquid side of some or all of the tubes in the core to the adjacent vapor side. This provides an optimized distribution of the liquid refrigerant so that the efficiency of the evaporator as a unit will be materially increased.

As shown best in FIG. 2, the refrigerant R flows into the liquid side of the tube and around the end of the rib 40, 42 in a generally U-flow pattern and the hot air, such as in the interior of the vehicle passenger compartment is blown across the outer surfaces of the tubes. Thermal energy of the air is transferred to the refrigerant causing some of the refrigerant to change to the gaseous state as it expands and exits through the vapor side of the tube.

However, since the openings 44, 46 and 48 are provided in this construction, quantities of the refrigerant R will remain in the liquid state, flow arrows R-1, R-2, R-3, and will be available in dry out areas of the gaseous side of the tube, as well as in other subsequent tubes to thereby increase heat exchanger efficiency. Accordingly, with this invention, there is some liquid in the outlet side of each tube to provide greater potential for heat transfer because of the latent heat of vaporization. With the bypasses tailoring progressively decreasing in capacity in each rib, the flow of liquid through the heat exchanger there is optimized balance throughout all of the tubes comprising the core for an improved overall performance.

While the above description constitutes preferred embodiments of the invention, it will be appreciated that the invention can be modified and varied without departing from the scope and fair meaning of the accompanying claims.

I claim:

1. A tube for use in a heat exchanger having an air intake side and air outlet side, said tube having first and second interfacing plates, each of said plates having a rib extending longitudinally in said tube to define discrete flow channels for the fluid circulating therein, each of said ribs having discrete fluid bypass means formed therein so that said heat exchanger fluid traversing in said air intake side can leak over into the air outlet side to thereby increase the efficiency of said heat exchanger so that said attached tube will receive some increased quantities of liquid in their high efficiency sides for heat transfer because of latent heat of vaporization.

2. The tube defined in claim 1, above, wherein said bypass means is formed by a series of openings which progressively decrease in effective area form the room thereof to the terminal end.

3. A heat exchanger having a plurality of flattened tubes operatively interconnected together to provide passage for conducting a volatile heat exchanger fluid therethrough, connector means for interconnecting said tubes so that air can flow between tubes which are adjacent to one another, said tubes having a leading edge and a trailing edge and flattened side portions that are laterally spaced from one another, a rib in each of said tubes for separating said tubes into an intake side and an outlet side for said heat exchanging fluid, said intake side of said tubes providing a leading edge of a core so to receive air therebetween, said outlet side of said core providing a trailing side of said core for discharging air therefrom, and bypass means in each said core rib for transmitting a portion of said volatile heat exchanger fluid from said intake side to said outlet side so that said heat exchanger fluid will have volatile fluid in each said tube downstream of said intake side to increase the potential for heat transfer because of the latent heat of vaporization.

4. A tube for use in an evaporator for an air conditioning system comprising a pair of plates interconnected in a face to face relationship having a rib extending from a root in each said plate to a terminal end separating the tube into a liquid side and a vapor side with refrigerant flow from an inlet around the end of the rib to an outlet, bypass means in said rib along the extent thereof to allow liquid refrigerant to bypass said terminal end of said rib so that liquid refrigerant is supplied to the vapor side of the tube, and means for discharging the refrigerant from the vapor side of the tube to an adjacent tube.

* * * * *